United States Patent
Lee et al.

(10) Patent No.: US 10,262,186 B2
(45) Date of Patent: Apr. 16, 2019

(54) METHOD FOR AUTHENTICATING FINGERPRINT AND AUTHENTICATION APPARATUS USING SAME

(71) Applicant: SUPREMA INC., Gyeonggi-do (KR)

(72) Inventors: Kideok Lee, Gyeonggi-do (KR);
Hochul Shin, Gyeonggi-do (KR);
Hyeonchang Lee, Gyeonggi-do (KR);
Jong Man Lee, Gyeonggi-do (KR);
Bong Seop Song, Gyeonggi-do (KR);
Jae Won Lee, Gyeonggi-do (KR)

(73) Assignee: SUPREMA INC., Seongnam-si (KR)

( * ) Notice: Subject to any disclaimer, the term of this patent is extended or adjusted under 35 U.S.C. 154(b) by 2 days.

(21) Appl. No.: 15/205,687

(22) Filed: Jul. 8, 2016

(65) Prior Publication Data
US 2017/0046550 A1 Feb. 16, 2017

(30) Foreign Application Priority Data
Aug. 13, 2015 (KR) ........................ 10-2015-0114874

(51) Int. Cl.
*G06K 9/00* (2006.01)
*G06K 9/62* (2006.01)

(52) U.S. Cl.
CPC ........... *G06K 9/001* (2013.01); *G06K 9/6203* (2013.01)

(58) Field of Classification Search
CPC ............ G06K 9/00006–9/0012; G06K 9/6203
See application file for complete search history.

(56) References Cited

U.S. PATENT DOCUMENTS

| | | | | |
|---|---|---|---|---|
| 5,649,032 | A * | 7/1997 | Burt | G06K 9/32 348/588 |
| 6,094,499 | A * | 7/2000 | Nakajima | G06K 9/00087 356/71 |
| 6,219,462 | B1 * | 4/2001 | Anandan | G06K 9/6203 382/278 |
| 9,639,679 | B2 * | 5/2017 | Nada | G06F 21/32 |
| 9,792,485 | B2 * | 10/2017 | Oreifej | G06K 9/001 |

(Continued)

FOREIGN PATENT DOCUMENTS

JP 2010-061576 A 3/2010
KR 10-2013-0069148 6/2013

*Primary Examiner* — Aaron W Carter
(74) *Attorney, Agent, or Firm* — Brinks Gilson & Lione

(57) ABSTRACT

There is provided a method for authenticating a fingerprint. The method includes receiving an inputted fingerprint image; selecting a plurality of comparison target pixels from pixels in the inputted fingerprint image and selecting a plurality of comparison reference pixels from pixels in a pre-stored registered fingerprint image; and determining a similarity of an overlapping area where the inputted fingerprint image overlaps the registered fingerprint image whenever a matching arrangement of each of the comparison target pixels is made with respect to each of the comparison reference pixels. The method further includes, whenever it is determined that the overlapping area is similar, comparing the inputted fingerprint image and the registered fingerprint image within the overlapping area to calculate a correlation score with respect to the overlapping area and authenticating the inputted fingerprint image based on the calculated correlation score.

9 Claims, 7 Drawing Sheets

(56) References Cited

U.S. PATENT DOCUMENTS

| | | | | |
|---|---|---|---|---|
| 2001/0019622 A1* | 9/2001 | Huang | ............... | G06K 9/00087 382/124 |
| 2003/0007671 A1* | 1/2003 | Ailisto | ............... | G06K 9/00087 382/124 |
| 2003/0103658 A1* | 6/2003 | Pan | .................... | G06K 9/00087 382/124 |
| 2004/0068669 A1* | 4/2004 | Uchida | .............. | G06K 9/00067 726/5 |
| 2005/0163352 A1* | 7/2005 | Itoh | .................... | G06K 9/00026 382/124 |
| 2005/0213798 A1* | 9/2005 | Itoh | .................... | G06K 9/00087 382/124 |
| 2006/0066572 A1* | 3/2006 | Yumoto | ................ | G06F 3/0317 345/157 |
| 2006/0210170 A1* | 9/2006 | Yumoto | ............... | G06K 9/0008 382/219 |
| 2007/0019844 A1* | 1/2007 | Yumoto | ............. | G06K 9/00087 382/124 |
| 2007/0031014 A1* | 2/2007 | Soderberg | .......... | G06K 9/00093 382/125 |
| 2007/0192591 A1* | 8/2007 | Yumoto | ................. | G06F 21/32 713/159 |
| 2007/0292008 A1* | 12/2007 | Yumoto | ............. | G06K 9/00087 382/124 |
| 2008/0089563 A1* | 4/2008 | Yumoto | ............. | G06K 9/00087 382/124 |
| 2010/0046810 A1* | 2/2010 | Yamada | ............. | G06K 9/00026 382/124 |
| 2010/0061602 A1* | 3/2010 | Yamada | ............. | G06K 9/00067 382/124 |
| 2012/0098948 A1* | 4/2012 | Lee | ...................... | A61B 5/1172 348/77 |
| 2012/0189171 A1* | 7/2012 | Abiko | .................... | G06K 9/036 382/115 |
| 2012/0304267 A1* | 11/2012 | Yamada | ............. | G06K 9/00006 726/7 |
| 2013/0329967 A1* | 12/2013 | Abiko | ................ | G06K 9/00026 382/115 |
| 2014/0020090 A1* | 1/2014 | Nada | ...................... | G06K 9/036 726/19 |
| 2016/0307023 A1* | 10/2016 | Kim | .................... | G06K 9/00087 |
| 2017/0004295 A1* | 1/2017 | Kim | .................... | G06F 17/3028 |
| 2017/0004341 A1* | 1/2017 | Oreifej | ................ | G06K 9/001 |
| 2017/0046550 A1* | 2/2017 | Lee | ...................... | G06K 9/001 |
| 2017/0140207 A1* | 5/2017 | Zhu | .................... | G06K 9/00073 |

* cited by examiner

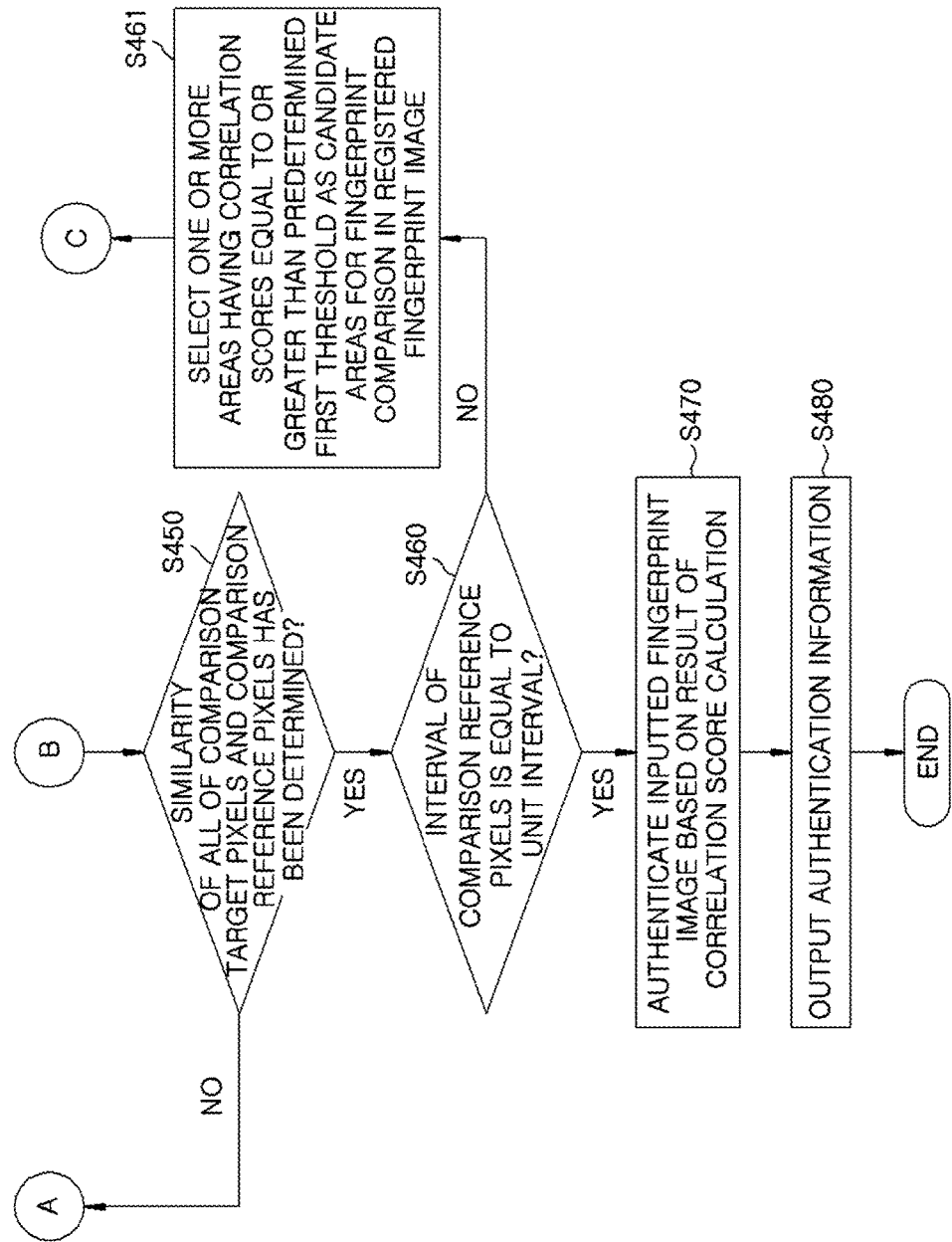

METHOD FOR AUTHENTICATING FINGERPRINT AND AUTHENTICATION APPARATUS USING SAME

CROSS-REFERENCE TO RELATED APPLICATIONS

This application claims the benefit of Korean Patent Application No. 10-2015-0114874, filed on Aug. 13, 2015, which is incorporated herein by reference in its entirety.

BACKGROUND OF THE INVENTION

1. Field of the Invention

The present disclosure relates to a fingerprint authentication method and a fingerprint authentication apparatus using the same, and more particularly to a method and an apparatus for authenticating a fingerprint by selecting target pixels to calculate correlation scores from pixels in a fingerprint image obtained through a fingerprint sensor having a very small sensing area, calculating correlation scores on the basis of the selected pixels, and authenticating the fingerprint based on the calculated correlation scores.

2. Description of the Related Art

Recently, as a security device becomes increasingly more important, an authentication apparatus using various types of biometric information have been developed. For example, various methods using a part of a human body such as a face, a fingerprint, an iris and/or a blood vessel as the biometric information are applied to the authentication apparatus.

Among these methods, the fingerprint authentication method is implemented by comparing an inputted fingerprint image of a user to be authenticated with a registered fingerprint image. Such a method may be applied to a small device including a portable electronic device such as a tablet, e-reader and a smartphone.

The fingerprint sensor used in this kind of the portable electronic device may have a very small sensing area. In this case, the fingerprint image obtained through the fingerprint sensor may not include sufficient minutiae such as bifurcations, ridge endings, and cores for the comparison. It is hard to ensure authentication accuracy with such an image which does not include sufficient minutiae.

Therefore, in order to ensure the authentication accuracy, the fingerprint authentication method for use in an apparatus having the very small sensing area employs a process of calculating correlation scores with respect to pixels in the fingerprint image instead of the aforementioned minutiae. However, it takes quite a long time to calculate the correlation scores with respect to all pixels in the fingerprint image.

SUMMARY OF THE INVENTION

In view of the above, the present disclosure provides a method and an apparatus for authenticating a fingerprint to ensure authentication accuracy and fast authentication speed while authenticating a fingerprint by using correlation scores of fingerprint images obtained through a fingerprint sensor with a very small sensing area ensure authentication accuracy and fast authentication speed, by selecting pixels for calculating correlation scores from the pixels included in the fingerprint images and calculating the correlation scores for the selected pixels to authenticate the fingerprint. The present disclosure has been achieved in a project (WC300 project) carried out by the present inventors.

However, it should be noted that the problems to be solved by the present disclosure are not limited to those mentioned above, and other problems to be solved but not mentioned above shall be apparently understood by those skilled in the art to which the present disclosure belongs.

In accordance with an aspect of the present disclosure, there is provided a method for authenticating a fingerprint, the method including: receiving an inputted fingerprint image; selecting a plurality of comparison target pixels from pixels in the inputted fingerprint image and selecting a plurality of comparison reference pixels from pixels in a pre-stored registered fingerprint image; determining a similarity of an overlapping area where the inputted fingerprint image overlaps the registered fingerprint image whenever a matching arrangement of each of the comparison target pixels is made with respect to each of the comparison reference pixels; whenever it is determined that the overlapping area is similar, comparing the inputted fingerprint image and the registered fingerprint image within the overlapping area to calculate a correlation score with respect to the overlapping area; and authenticating the inputted fingerprint image based on the calculated correlation score.

Further, the process of determining the similarity of the overlapping area may include selecting adjacent pixels around the corresponding comparison target pixel used in the matching arrangement in the overlapping area; and comparing at least one of brightness information of a ridge and a valley, ridge direction information, and ridge curvature information between the adjacent pixels in the inputted fingerprint image and pixels, corresponding to the adjacent pixels, in the registered fingerprint image, respectively, to determine the similarity between the inputted fingerprint image and the registered fingerprint image within the overlapping area.

Further, the method for authenticating the fingerprint may further includes checking whether the similarity of the overlapping area has been determined for all of the comparison target pixels and the comparison reference pixels; checking whether an interval of the comparison reference pixels is equal to a unit interval when it is checked that the similarity of the overlapping area has been determined for all of the comparison target pixels and the comparison reference pixels; and selecting, when it is checked that the interval of the comparison reference pixels is greater than the unit interval, at least one candidate area for a fingerprint comparison having a new interval smaller than the checked interval.

Further, the process of selecting the at least one candidate area for the fingerprint comparison may include comparing the correlation score, obtained whenever it is determined that the overlapping area is similar, with a threshold; selecting, as the candidate area, an area having the correlation score equal to or greater than the threshold in the registered fingerprint image; and selecting the comparison reference pixels in the candidate area at the new interval smaller than the checked interval.

In accordance with another aspect of the present disclosure, there is provided an apparatus for authenticating a fingerprint, the apparatus including: an input unit configured to receive an inputted fingerprint image from a user to be authenticated; a pixel selection unit configured to select a plurality of comparison target pixels from pixels in the inputted fingerprint image and a plurality of comparison reference pixels from pixels in a pre-stored registered fingerprint image; a similarity determination unit configured to determine a similarity of an overlapping area where the inputted fingerprint image overlaps the registered fingerprint image whenever a matching arrangement of each of the comparison target pixels is made with respect to each of the comparison reference pixels; a correlation calculation unit configured to, whenever it is determined that the overlapping area is similar, compare the inputted fingerprint image and the registered fingerprint image within the overlapping area to calculate a correlation score with respect to the overlapping area; an authentication unit configured to authenticate the inputted fingerprint image based on the calculated correlation score; and an output unit configured to output authentication information based on a result obtained by the authentication unit.

Further, the similarity determination unit may be configured to select adjacent pixels around the corresponding comparison target pixel used in the matching arrangement in the overlapping area; compare at least one of brightness information of a ridge and a valley, ridge direction information, and ridge curvature information between the adjacent pixels in the inputted fingerprint image and pixels, corresponding to the adjacent pixels, in the registered fingerprint image, respectively, to determine the similarity between the inputted fingerprint image and the registered fingerprint image within the overlapping area.

Further, the apparatus for authenticating the fingerprint further includes a calculation check unit configured to check whether the similarity of the overlapping area has been determined for all of the comparison target pixels and the comparison reference pixels; an interval check unit configured to check whether an interval of the comparison reference pixels is equal to a unit interval when it is checked that the similarity of the overlapping area has been determined for all of the comparison target pixels and the comparison reference pixels; and an area selection unit configured to select, when it is checked that the interval of the comparison reference pixels is greater than the unit interval, at least one candidate area for a fingerprint comparison having a new interval smaller than the checked interval.

Further, the area selection unit may be configured to compare the correlation score obtained whenever it is determined that the overlapping area is similar with a threshold; select, as the candidate area, an area having the correlation score equal to or greater than the threshold in the registered fingerprint image; and select the comparison reference pixels in the candidate area at the new interval smaller than the checked interval.

Accordingly, in accordance with embodiments of the present disclosure, fast fingerprint authentication as well as fingerprint authentication accuracy is ensured since fingerprint authentication is carried out by selecting target pixels from the plurality of pixels in the fingerprint image obtained through a fingerprint sensor having a very small sensing area and calculating the correlation scores of the overlapping areas overlapped on the basis of each target pixel only when it is determined that each of the overlapping areas is similar.

BRIEF DESCRIPTION OF THE DRAWINGS

FIGS. 4A and 4B show a flow chart illustrating a method for authenticating the fingerprint in accordance with a second embodiment of the present disclosure.

DETAILED DESCRIPTION OF THE PREFERRED EMBODIMENTS

Advantages and features of the present disclosure, and a method for achieving them will be apparent with reference to the embodiments described herein below in detail together with accompanying drawings. However, it should be noted that the present disclosure is not limited to the embodiments disclosed herein below, but may be implemented in various forms. It should be noted that the embodiments are provided to make the description of the present disclosure complete, and assist those skilled in the art of the present disclosure to understand the scope of present disclosure, defined just by the scope of the claims.

In the following description, well-known functions and/or constitutions will not be described in detail if they would unnecessarily obscure the features of the present disclosure in unnecessary detail. Further, the terms to be described below are defined in consideration of their functions in the embodiments of the present disclosure and may vary depending on user's or operator's intention or practice. Accordingly, the definition may be made on the basis of the content throughout the specification.

Figure 1:
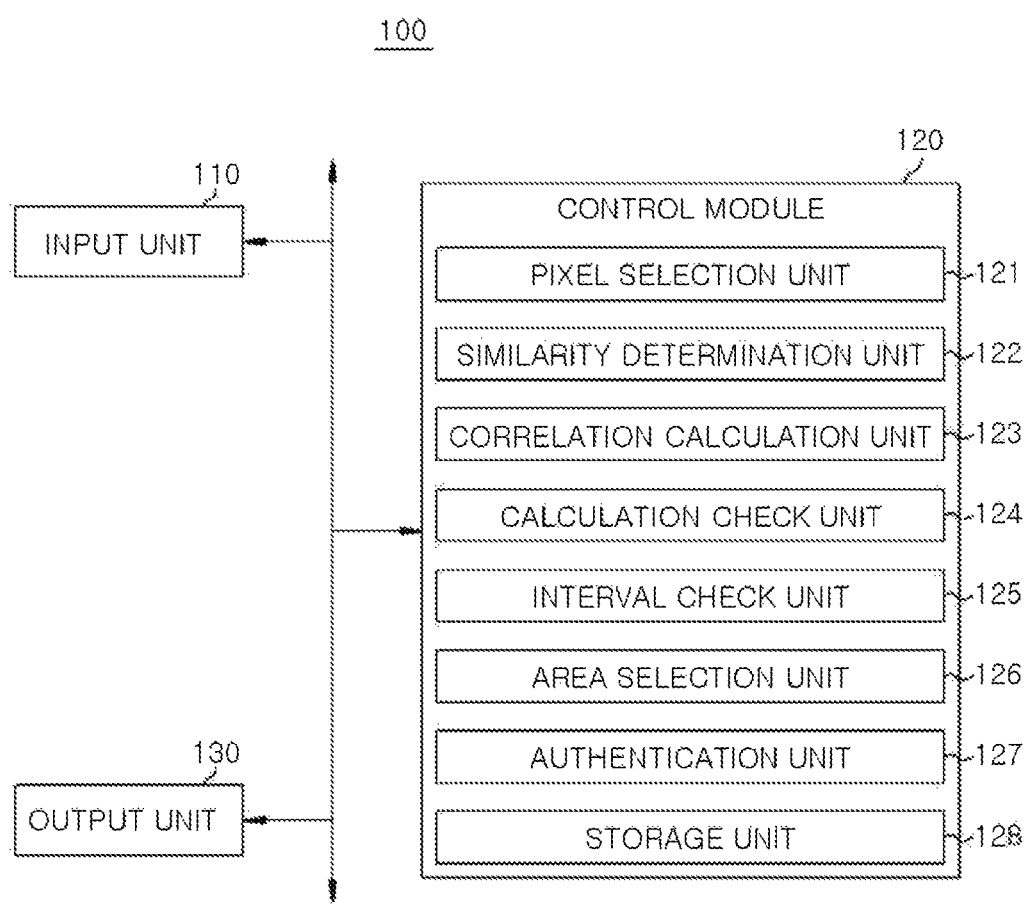
FIG. 1 shows a configuration of an apparatus for authenticating a fingerprint in accordance with an embodiment of the present disclosure.

FIG. 1 shows a configuration of a fingerprint authentication apparatus in accordance with an embodiment of the present disclosure.

As shown in FIG. 1, the fingerprint-authenticating apparatus 100 includes an input unit 110, a control module 120, and an output unit 130.

The input unit 110 receives a fingerprint image from a user to be authenticated. The input unit 110 includes a fingerprint sensor for acquiring the fingerprint image.

The control module 120 performs a fingerprint authentication by comparing the inputted fingerprint image received from the input unit 110 with a registered fingerprint image stored in advance. The control module 120 includes a pixel selection unit 121, a similarity determination unit 122, a correlation calculation unit 123, a calculation check unit 124, an interval check unit 125, an area selection unit 126, an authentication unit 127, and a storage unit 128.

The pixel selection unit 121 selects a plurality of comparison target pixels from pixels in the inputted fingerprint image received from the input unit 110, and selects a plurality of comparison reference pixels from pixels in the registered fingerprint image received from the storage unit 128. The comparison target pixels and the comparison reference pixels refer to pixels to be used as criteria for determining a similarity between the inputted fingerprint image and the registered fingerprint image. Some or all pixels in the inputted fingerprint image may be selected as the comparison target pixels and some or all pixels in the registered fingerprint image may be selected as the comparison reference pixels. Moreover, the comparison target pixels and the comparison reference pixels may be selected to be distributed at given intervals in the inputted fingerprint image and the registered fingerprint image, respectively. Further, when the area selection unit 126 selects an area for a fingerprint comparison which will be described later, the pixel selection unit 121 may select new comparison reference pixels at an interval smaller than that of the previously-selected comparison reference pixels.

The similarity determination unit 122 determines a similarity of an overlapping area where the inputted fingerprint image overlaps the registered fingerprint image by using the comparison target pixels and the comparison reference pixels selected by the pixel selection unit 121. Specifically, the similarity determination unit 122 determines the similarity of the overlapping area where the inputted fingerprint image overlaps the registered fingerprint image whenever a matching arrangement of each of the comparison target pixels is made with respect to each of the comparison reference pixels.

More specifically, whenever each of the comparison target pixels is arranged to match each of the comparison reference pixels, the similarity determination unit 122 first rotates the inputted fingerprint image about the comparison target pixel used in the matching arrangement such that the inputted fingerprint image is aligned with the registered fingerprint image to make a ridge direction of the inputted fingerprint image be similar to that of the registered fingerprint image.

Next, the similarity determination unit 122 selects one or more adjacent pixels around the corresponding comparison target pixel used in the matching arrangement in the overlapping area and then compares feature information of the adjacent pixels in the inputted fingerprint image and pixels, corresponding to the adjacent pixels, in the registered fingerprint image, respectively, to thereby determine the similarity of the overlapping area. The feature information includes brightness information of a ridge and a valley, ridge direction information, and ridge curvature information of the pixels. Here, for example, the similarity of the overlapping area is determined to be similar when the feature differences between the inputted fingerprint image and the registered fingerprint image is within a predetermined range.

Further, at least one adjacent pixel may be selected, and, when a plurality of adjacent pixels are selected, the adjacent pixels may be distributed at a given interval around the corresponding comparison target pixel used in the matching arrangement. The brightness information of the ridge and the valley may be information about brightness of the concerned pixel, and may indicate a level of brightness or darkness, or a brightness of ranging from 0 to 255. The ridge direction information may indicate a direction of ridge where the concerned pixel is positioned. The ridge curvature information may indicate a level of ridge curve where the concerned pixel is positioned. As the ridge directions of neighboring pixels around the concerned pixel are more similar between the inputted fingerprint image and the registered fingerprint image, the ridge curvature information may include smaller values; and as the ridge directions are more different, the ridge curvature information may include greater values.

Whenever the similarity determination unit 122 determines that the overlapping area is similar, the correlation calculation unit 123 compares the inputted fingerprint image and the registered fingerprint image within the overlapping area pixel by pixel to calculate a correlation score with respect to the overlapping area.

The calculation check unit 124 checks whether all the comparison target pixels and all the comparison reference pixels selected by the pixel selection unit 121 have undergone the similarity determination. If not, the similarity determination unit 122 makes the comparison target pixels of which the similarity has not been determined and the comparison reference pixels of which the similarity has not been determined undergo the similarity determination.

After the calculation check unit 124 checks that the similarity determinations with respect to all of the comparison target pixels and the comparison reference pixels have been completed, the interval check unit 125 checks an interval of the comparison reference pixels selected in the registered fingerprint image.

When it is checked by the interval check unit 125 that the interval of the comparison reference pixels is not equal to and greater than a unit interval, the area selection unit 126 compares correlation scores for the cases where the similarity determination is made to be similar with a predetermined first threshold. The area selection unit 126 then selects, as candidate areas for the fingerprint comparison, one or more areas having the correlation scores equal to or greater than the predetermined first threshold in the registered fingerprint image. The unit interval may be a smallest unit for comparing the registered fingerprint image with the inputted fingerprint image, which may be selected to be 1 pixel interval. The area selection unit 126 may select each of the areas for the fingerprint comparison, so that a plurality of the comparison reference pixels can be included in each selected area.

The authentication unit 127 authenticates the inputted fingerprint image on the basis of the correlation scores calculated by the correlation calculation unit 123 obtained whenever the similarity determination is made to be similar. When the highest correlation score among the calculated correlation scores is equal to or greater than a predetermined second threshold, the authentication unit 127 determines that the inputted fingerprint image is identical to the registered fingerprint image, and authenticates the inputted fingerprint image.

The storage unit 128 stores the registered fingerprint image of the registered user and information about the authentication result.

The output unit 130 creates and outputs the information including the authentication result determined by the control module 120.

Figure 2:
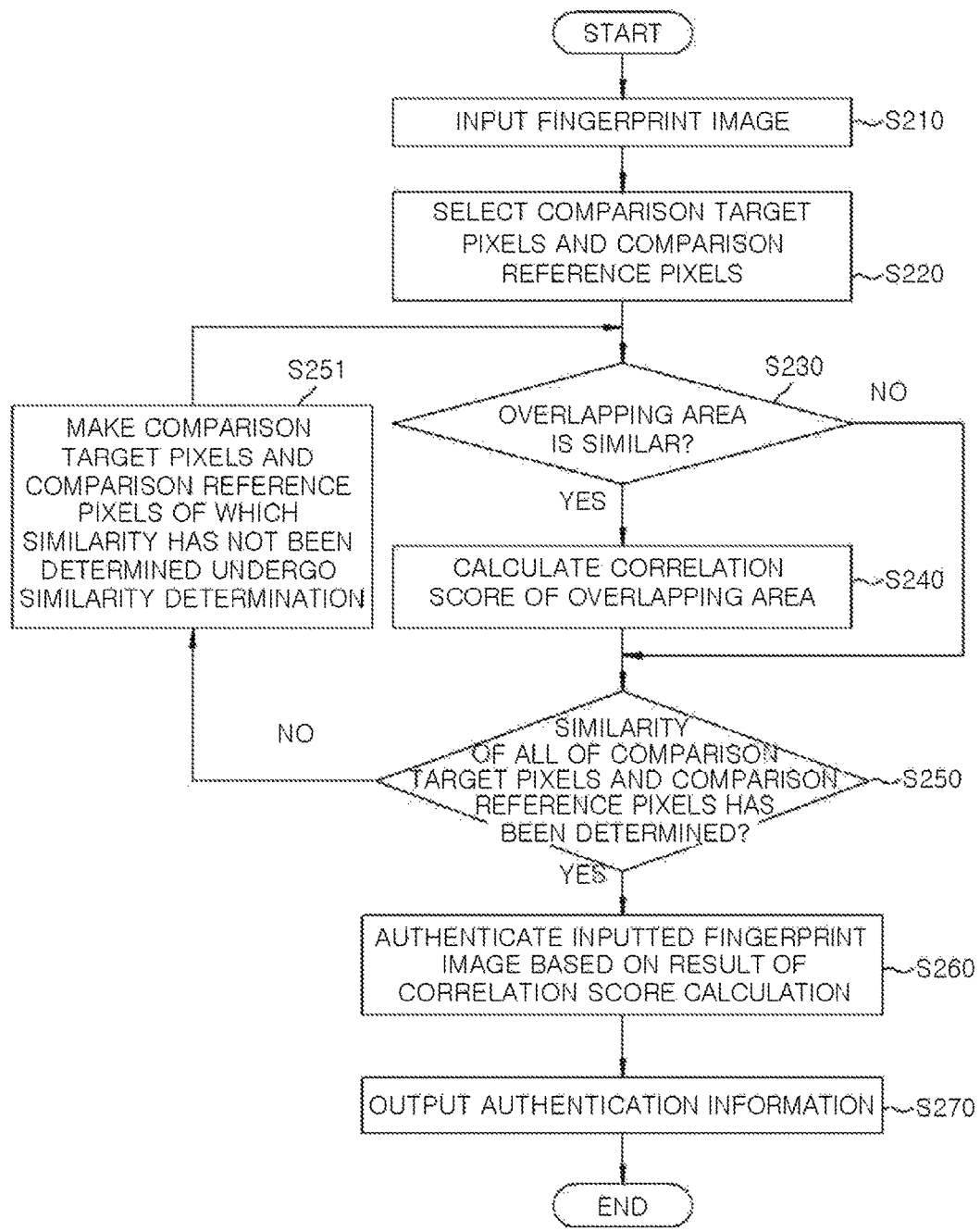
FIG. 2 shows a flow chart illustrating a method for authenticating the fingerprint in accordance with a first embodiment of the present disclosure.

FIG. 2 shows a flow chart illustrating a method for authenticating a fingerprint in accordance with a first embodiment of the present disclosure.

As shown in FIG. 2, the method for authenticating the fingerprint in accordance with the first embodiment includes a step S210 of receiving an inputted fingerprint image.

Further, the method includes a step S220 of selecting a plurality of comparison target pixels from pixels in the inputted fingerprint image and selecting a plurality of comparison reference pixels from pixels in a pre-stored registered fingerprint image.

Next, the method further includes a step S230 of determining a similarity of an overlapping area where the inputted fingerprint image overlaps the registered fingerprint image whenever a matching arrangement of each of the comparison target pixels is made with respect to each of the comparison reference pixels.

In the step S230, the inputted fingerprint image is rotated about the comparison target pixel, which is currently used in the similarity determination, such that the inputted fingerprint image is aligned with the registered fingerprint image to make a ridge direction of the inputted fingerprint image be similar to that of the registered fingerprint image. Then, one or more adjacent pixels around the comparison target pixel, which is currently used in the similarity determination, are selected in the overlapping area, and at least one of the brightness information of a ridge and a valley, ridge direction information, and ridge curvature information is compared between the adjacent pixels in the inputted fingerprint image and pixels, corresponding to the adjacent pixels, in the registered fingerprint image, respectively, to thereby determine whether the inputted fingerprint image is similar to the registered fingerprint image in the overlapping area.

Further, the method includes a step S240 of, when it is determined that the overlapping area is similar ("YES in the step S230), comparing the inputted fingerprint image and the registered fingerprint image within the overlapping area pixel by pixel to calculate a correlation score with respect to the overlapping area in the case where the concerned comparison target pixel and the comparison reference pixel are used in the similarity determination.

Furthermore, the method includes a step S250 of checking whether all of the comparison target pixels and the comparison reference pixels have undergone the similarity determination either in the case of "NO" in the step S230 or after the step S240. The method further includes a step S251 of, if "NO" in the step S250, making the comparison target pixels of which the similarity has not been determined and the comparison reference pixels of which the similarity has not been determined undergo the similarity determination. The steps S230, S240, S250 and S251 are repeated until all of the comparison target pixels and the comparison reference pixels have undergone the similarity determination.

The method further includes a step S260 of authenticating the inputted fingerprint image based on all of the calculated correlation scores in the cases where the similarity determination is made to be similar after all of the comparison target pixels and the comparison reference pixels have undergone the similarity determination ("YES" in the step S250) and a step S270 of outputting the authentication information.

The first embodiment of the present disclosure is described herein below with reference to FIGS. 1 to 3B.

First, the input unit 110 receives a fingerprint image from a user to be authenticated (step S210).

The pixel selection unit 121 selects a plurality of comparison target pixels from pixels in the inputted fingerprint image received from the input unit 110 and selects a plurality of comparison reference pixels from pixels in the registered fingerprint image received from the storage unit 128 (step S220). In this example, the pixel selection unit 121 selects all pixels in the inputted fingerprint image as the comparison target pixels, and all pixels in the registered fingerprint image as the comparison reference pixels.

Figure 3A:
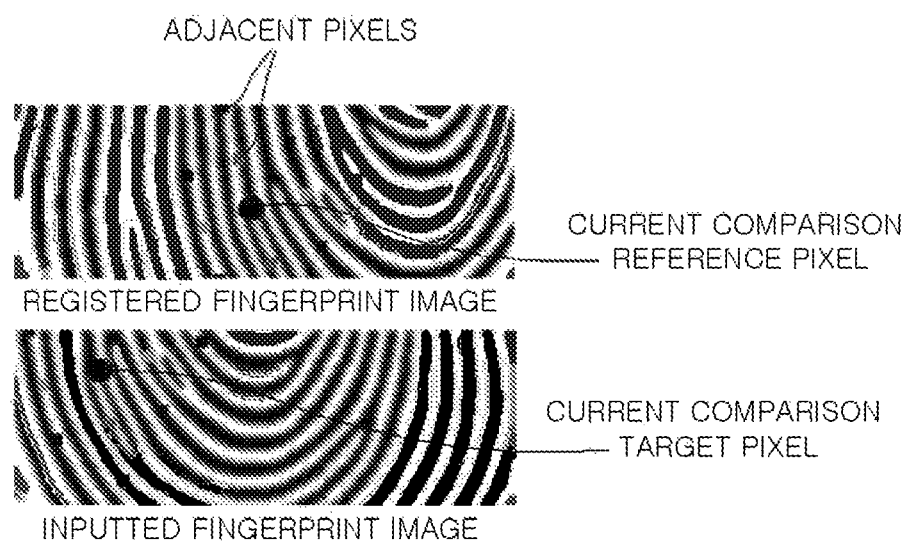
FIGS. 3A and 3B illustrate a similarity determination in the method for authenticating the fingerprint.
Figure 3B:
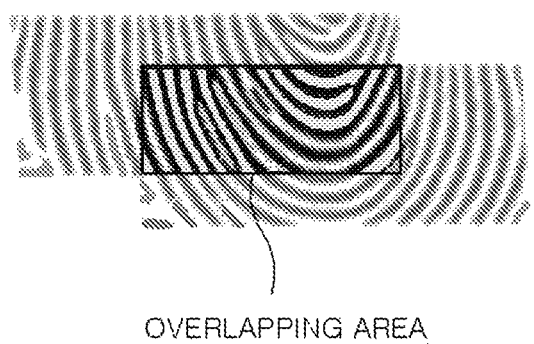

The similarity determination unit 122 determines a similarity of an overlapping area where the inputted fingerprint image overlaps the registered fingerprint image whenever a matching operation of each of the comparison target pixels is made with respect to each of the comparison reference pixels (step S230). For example, the similarity determination unit 122 aligns the inputted fingerprint image with the registered fingerprint image along their ridge directions as shown in FIGS. 3A and 3B. Then, in order to determine the similarity of the overlapping area overlapped through the alignment of the images, the similarity determination unit 122 selects a plurality of adjacent pixels around the comparison target pixel currently used in the similarity determination, and compares the feature information including brightness information of a ridge and a valley, ridge direction information, and ridge curvature information between the adjacent pixels in the inputted fingerprint image and pixels, corresponding to the adjacent pixels, in the registered fingerprint image, respectively.

When it is determined that the overlapping area is similar, the correlation calculation unit 123 compares the inputted fingerprint image and the registered fingerprint image within the overlapping area pixel by pixel to calculate a correlation score of the overlapping area in case of using the concerned comparison target pixel and the concerned comparison reference pixel in the similarity determination (step S240). That is to say, the correlation calculation unit 123 calculates the correlation score of the overlapping area pixel by pixel only if the similarity determination unit 122 determines that the overlapping area is similar. Therefore, the number of total pixels used for calculating correlation scores can be reduced.

The calculation check unit 124 checks whether all the comparison target pixels and all the comparison reference pixels selected by the pixel selection unit 121 have undergone the similarity determination (step S250).

When it is checked by the calculation check unit 124 that the similarity determination is not completed for all of the comparison target pixels and the comparison reference pixels, the similarity determination unit 122 again performs the similarity determination for the comparison target pixels and the comparison reference pixels of which the similarity has not been determined (step S251).

The authentication unit 127 authenticates the inputted fingerprint image based on all the correlation scores calculated by the correlation calculation unit 123 in the cases where it is determined that the overlapping area is similar in the step S240 (step S260). The authentication unit 127 may determine that the inputted fingerprint image matches the registered fingerprint image and authenticates the inputted fingerprint image, based on the condition that the highest correlation score among the correlation scores calculated by the correlation calculation unit 123 is equal to or greater than a predetermined second threshold.

The output unit 130 creates and outputs authentication information including the authentication result determined by the authentication unit 127 (step S270).

Figure 4A:
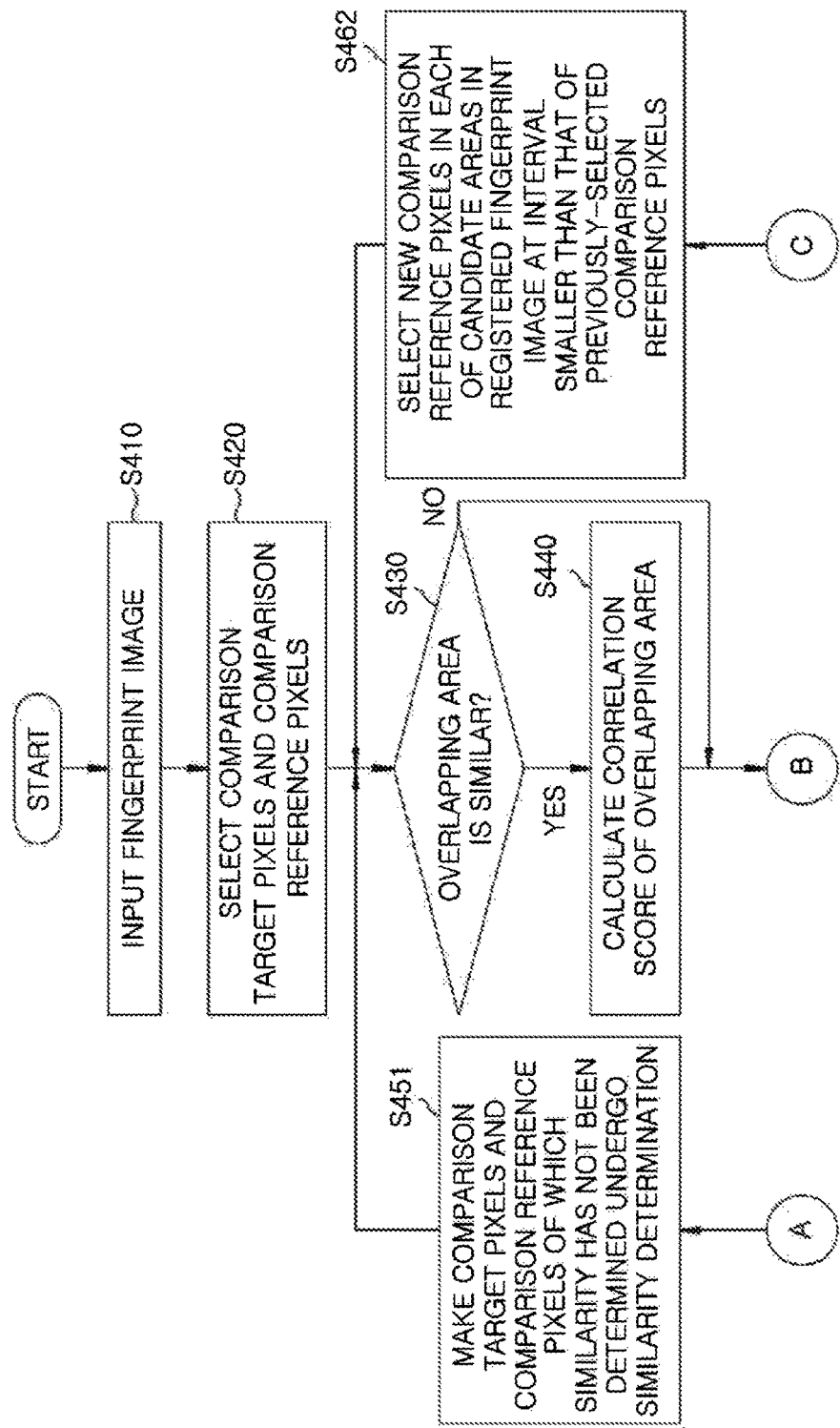

FIGS. 4A and 4B shows a flow chart illustrating a method for authenticating a fingerprint in accordance with a second embodiment of the present disclosure.

As shown in FIGS. 4A and 4B, the method for authenticating a fingerprint in accordance with the second embodiment includes a step S410 of receiving an inputted fingerprint image.

The method further includes a step S420 of selecting a plurality of comparison target pixels from pixels in the inputted fingerprint image and selecting a plurality of comparison reference pixels from pixels in a pre-stored registered fingerprint image. Here, the comparison target pixels may be selected at a given interval from the pixels in the inputted fingerprint image and the comparison reference pixels may be selected at a given interval from the pixels in the registered fingerprint image.

Further, the method includes a step S430 of determining a similarity of an overlapping area where the inputted fingerprint image overlaps the registered fingerprint image whenever a matching arrangement of each of the comparison target pixels is made with respect to each of the comparison reference pixels.

In the step S430, the inputted fingerprint image is rotated about the comparison target pixel, which is currently used in the similarity determination, such that the inputted fingerprint image is aligned with the registered fingerprint image to make a ridge direction of the inputted fingerprint image be similar to that of the registered fingerprint image. Then, one or more adjacent pixels around the comparison target pixel, which is currently used in the similarity determination, are selected in the overlapping area, and at least one of the brightness information of a ridge and a valley, ridge direction information, and ridge curvature information is compared between the adjacent pixels in the inputted fingerprint image and pixels, corresponding to the adjacent pixels, in the registered fingerprint image, respectively, to thereby determine whether the inputted fingerprint image is similar to the registered fingerprint image in the overlapping area.

Further, the method includes a step S440 of, when it is determined that the overlapping area is similar ("YES in the step S430), comparing the inputted fingerprint image and the registered fingerprint image within the overlapping area pixel by pixel to calculate a correlation score with respect to the overlapping area.

Furthermore, the method includes a step S450 of checking whether all of the comparison target pixels and the comparison reference pixels have undergone the similarity determination either in the case of "NO" in the step S430 or after the step S440. The method further includes a step S451 of, if "NO" in the step S450, making the comparison target pixels of which the similarity has not been determined and the comparison reference pixels of which the similarity has not been determined undergo the similarity determination. The steps S430, S440, S450 and S451 are repeated until all of the comparison target pixels and the comparison reference pixels have undergone the similarity determination.

Further, the method includes a step S460 of checking whether an interval of the comparison reference pixels is equal to a unit interval after it is checked that the similarity determinations with respect to all of the comparison target pixels and the comparison reference pixels have been completed in the step S450.

Moreover, the method includes a step S461 of, if "NO" in the step S460, selecting one or more candidate areas for the fingerprint comparison in the registered fingerprint image when the checking result in the step S460 indicates that the interval of the comparison reference pixels is not equal to and greater than the unit interval. In the step S461, correlation scores for the cases where the similarity determination is made to be similar are compared with a first threshold and one or more areas having the correlation scores equal to or greater than the first threshold in the registered fingerprint image are selected as the candidate areas for the fingerprint comparison.

Further, the method includes a step S462 of selecting new comparison reference pixels in each of the candidate areas in the registered fingerprint image at an interval smaller than that of the previously-selected comparison reference pixels. After the step S462, the steps S430, S440, S450 and S451 are repeated until all of the comparison target pixels and the comparison reference pixels have undergone the similarity determination, and then the steps S460, S461 and S462 are performed until the interval of the comparison reference pixels is equal to the unit interval.

Further, the method includes a step S470 of, if "YES" in the step S460, authenticating the inputted fingerprint image based on the correlation scores calculated in all the cases where the similarity determination is made to be similar by using the comparison target pixels in the inputted fingerprint image and the comparison reference pixels in a final candidate area having the unit interval in the registered finger print image and a step S480 of outputting the authentication information.

The second embodiment of the present disclosure is described herein below with reference to FIGS. 1, 4A, 4B, 5A, and 5B.

First, the input unit 110 receives a fingerprint image from a user to be authenticated (step S410).

Figure 5A:
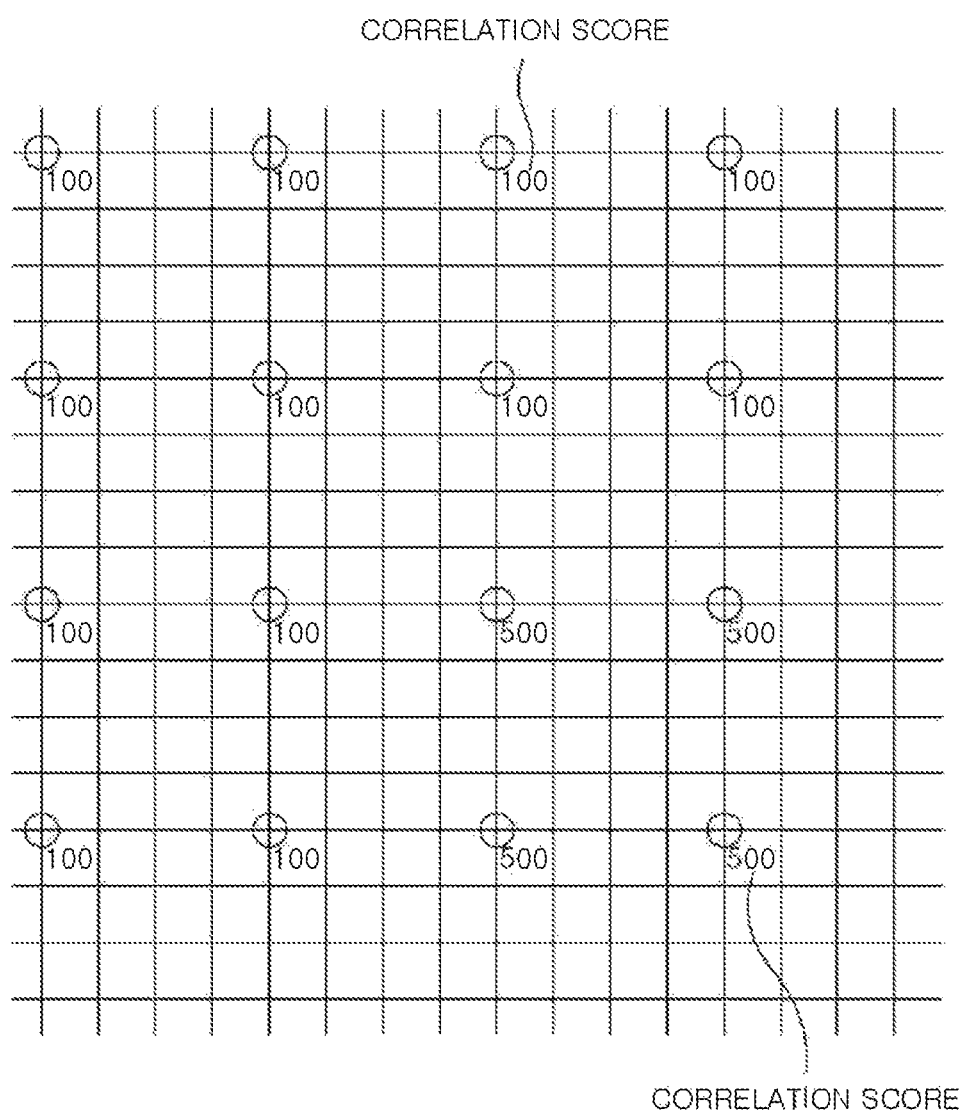
FIGS. 5A and 5B illustrate a process of reducing fingerprint comparison areas in the method for authenticating the fingerprints.

The pixel selection unit 121 selects a plurality of comparison target pixels from pixels in the inputted fingerprint image received from the input unit 110 (step S420). Further, the pixel selection unit 121 selects a plurality of comparison reference pixels at a given interval from pixels in the registered fingerprint image received from the storage unit 128 (step S420). The interval when selecting the comparison target pixels and the comparison reference pixels may be predetermined by the user. For example, the pixel selection unit 121 may select all pixels in the inputted fingerprint image as the comparison target pixels, and select the comparison reference pixels at a 4-pixel interval from all pixels in the registered fingerprint image as shown in FIG. 5A.

The similarity determination unit 122 determines a similarity of an overlapping area where the inputted fingerprint image overlaps the registered fingerprint image whenever a matching arrangement of each of the comparison target pixels is made with respect to each of the comparison reference pixels selected by the pixel selection unit 121 (step S430). For example, the similarity determination unit 122 aligns the inputted fingerprint image with the registered fingerprint image along their ridge directions. Then, in order to determine the similarity of the overlapping area overlapped through the alignment of the images, the similarity determination unit 122 selects a plurality of adjacent pixels around the comparison target pixel currently used in the similarity determination, and compares the feature information including brightness information of a ridge and a valley, ridge direction information, and ridge curvature information between the adjacent pixels in the inputted fingerprint image and pixels, corresponding to the adjacent pixels, in the registered fingerprint image.

In case that the similarity determination unit 122 determines the overlapping area is similar, the correlation calculation unit 123 compares the inputted fingerprint image and the registered fingerprint image within the overlapping area pixel by pixel to calculate a correlation score of the overlapping area in the case where the concerned comparison reference pixel is used in the similarity determination (step S440).

The calculation check unit 124 checks whether all the comparison target pixels and all the comparison reference pixels selected by the pixel selection unit 121 have undergone the similarity determination (step S450).

When it is checked by the calculation check unit 124 that the similarity determination is not completed for all of the comparison target pixels and the comparison reference pixels, the similarity determination unit 122 again performs the similarity determination for the comparison target pixels and the comparison reference pixels of which the similarity has not been determined (step S451).

After it is checked that the similarity determinations with respect to all of the comparison target pixels and the comparison reference pixels have been completed by the calculation check unit 124, the interval check unit 125 checks whether an interval of the comparison reference pixels in the registered fingerprint image is equal to a unit interval (step S460).

Figure 5B:
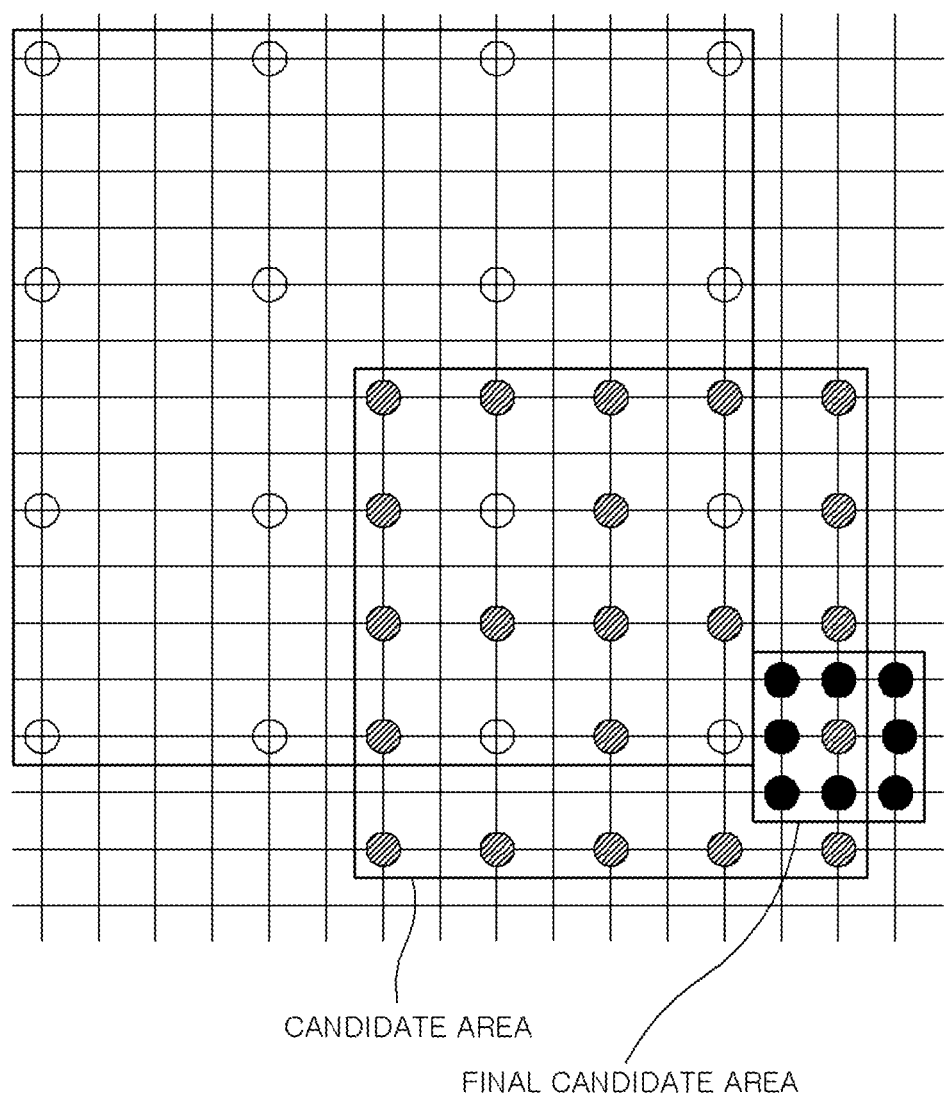

When it is checked by the interval check unit 125 that the interval of the comparison reference pixels is not the unit interval, as shown in FIGS. 5A and 5B, the area selection unit 126 compares correlation scores for all the cases where the similarity determination is made to be similar with a first threshold and selects one or more areas having the correlation scores equal to or greater than the first threshold in the registered fingerprint image as candidate areas for the fingerprint comparison (step S461).

After the area selection unit 126 selects the candidate areas for the fingerprint comparison, the pixel selection unit 121 selects new comparison reference pixels in each of the candidate areas at an interval smaller than that of the previously-selected comparison reference pixels (step S462). Therefore, as shown in FIG. 5B, it is possible to reduce the number of total pixels necessary for calculating correlation scores by reducing the interval of comparison reference pixels in each of the candidate areas of which the correlation score is equal to or greater than the first threshold, step by step from the 2-pixel interval to the 1-pixel interval (unit interval).

When it is checked by the interval check unit 125 that the interval of comparison reference pixels is the unit interval, the authentication unit 127 authenticates the inputted fingerprint image based on the correlation scores calculated in all the cases where the similarity determination is made to be similar by using the comparison target pixels in the inputted fingerprint image and the comparison reference pixels in a final candidate area having the unit interval in the registered finger print image (step S470). For example, when the highest correlation score among the correlation scores calculated by the correlation calculation unit 123 is equal to or greater than a predetermined second threshold, the authentication unit 127 determines that the inputted fingerprint image matches the registered fingerprint image and thus authenticates the inputted fingerprint image.

The output unit 130 creates and outputs authentication information including the authentication result determined by the authentication unit 127 (step S480).

The method for authenticating the fingerprint in accordance with the embodiments of the present disclosure may be implemented in a computer-readable storage medium including computer-executable instructions, which cause, when executed by a processor, the processor to perform the method for authenticating the fingerprint.

The combinations of respective sequences of a flow diagram attached herein may be carried out by computer program instructions. Since the computer program instructions may be executed by processors of a general purpose computer, a special purpose computer, or other programmable data processing apparatus, the instructions, c executed by the processor of the computer or other programmable data processing apparatus, create means for performing functions described in the respective sequences of the sequence diagram. Since the computer program instructions, in order to implement functions in specific manner, may be stored in a memory useable or readable by the computer or the computer for other programmable data processing apparatus, the instruction stored in the memory useable or readable by a computer may produce manufacturing items including an instruction means for performing functions described in the respective sequences of the sequence diagram. Since the computer program instructions may be loaded in a computer or other programmable data processing apparatus, instructions, a series of sequences of which is executed in a computer or other programmable data processing apparatus to create processes executed by a computer to operate a computer or other programmable data processing apparatus, may provide operations for executing functions described in the respective sequences of the flow diagram.

Moreover, the respective sequences may indicate some of modules, segments, or codes including at least one executable instruction for executing a specific logical function(s). In some alternative embodiments, it is noted that the functions described in the sequences may run out of order. For example, two consecutive sequences may be substantially executed simultaneously or often in reverse order according to corresponding functions.

The above description just illustrates the technical idea of the present disclosure, and it will be understood by those skilled in the art to which this present disclosure belongs that various changes and modifications may be made without departing from the scope of the essential characteristics of the present disclosure. Therefore, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

What is claimed is:

1. A method for authenticating a fingerprint, the method comprising:
    receiving an inputted fingerprint image;
    selecting a plurality of comparison target pixels arranged at a first interval from pixels in the inputted fingerprint image and selecting a plurality of comparison reference pixels arranged at a second interval from pixels in a pre-stored registered fingerprint image;
    upon an occurrence of a matching arrangement in which each of the comparison target pixels is mapped onto each of the comparison reference pixels, overlapping a first region of the inputted fingerprint image and a second region of the registered fingerprint image for determining a similarity between the first region and the second region by comparing ridges of the first region and those of the second region, wherein the first region and the second region are within an overlapping area where the inputted fingerprint image overlaps the registered fingerprint image;
    upon determination that the first region and the second region are similar to each other according to the similarity, calculating a correlation score with respect to the overlapping area by comparing the first region and the second region pixel by pixel; and
    authenticating the inputted fingerprint image based on the calculated correlation score,
    wherein the first region and the second region are respectively obtained from larger prior starting first region and larger prior starting second region, after a series of prior similarity matching and correlation score calculations.

2. The method of claim 1, wherein said determining the similarity includes:
    selecting adjacent pixels around each of the comparison target pixels used in the matching arrangement in the overlapping area; and
    comparing at least one of brightness information of a ridge and a valley, ridge direction information, and ridge curvature information between the adjacent pixels in the inputted fingerprint image and pixels, corresponding to the adjacent pixels, in the registered fingerprint image, respectively, to determine the similarity.

3. The method of claim 1, further comprising:
    checking whether the similarity has been determined for all of the comparison target pixels and the comparison reference pixels;
    checking whether the second interval of the comparison reference pixels is equal to a unit interval when it is checked that the similarity has been determined for all of the comparison target pixels and the comparison reference pixels; and selecting, when it is checked that the second interval of the comparison reference pixels is greater than the unit interval, at least one candidate area for a fingerprint comparison having a new interval smaller than the second interval.

4. The method of claim 3, wherein said selecting the at least one candidate area for the fingerprint comparison includes:

comparing the correlation score, obtained when it is determined that the first region and the second region are similar to each other, with a threshold;

selecting, as the candidate area, an area having the correlation score equal to or greater than the threshold in the registered fingerprint image; and selecting the comparison reference pixels in the candidate area arranged at the new interval smaller than the second interval.

5. A non-transitory computer-readable storage medium including computer-executable instructions, which cause, when executed by a processor, the processor to perform the method for authenticating the fingerprint of claim 1.

6. An apparatus for authenticating a fingerprint, the apparatus comprising:

an input unit configured to receive an inputted fingerprint image from a user to be authenticated;

a pixel selection unit configured to select a plurality of comparison target pixels arranged at a first interval from pixels in the inputted fingerprint image and a plurality of comparison reference pixels arranged at a second interval from pixels in a pre-stored registered fingerprint image;

a similarity determination unit configured to, upon an occurrence of a matching arrangement in which each of the comparison target pixels is mapped onto each of the comparison reference pixels, overlap a first region of the inputted fingerprint image and a second region of the registered fingerprint image to determine a similarity between the first region and the second region by comparing ridges of the first region and those of the second region, wherein the first region and the second region are within an overlapping area where the inputted fingerprint image overlaps the registered fingerprint image;

a correlation calculation unit configured to calculate a correlation score with respect to the overlapping area by comparing the first region and the second region pixel by pixel when the first region and the second region are determined to be similar to each other according to the similarity;

an authentication unit configured to authenticate the inputted fingerprint image based on the calculated correlation score; and an output unit configured to output authentication information based on a result obtained by the authentication unit, wherein the first region and the second region are respectively obtained from larger prior starting first region and larger prior starting second region, after a series of prior similarity matching and correlation score calculations.

7. The apparatus of claim 6, wherein the similarity determination unit is configured to:

select adjacent pixels around each of the comparison target pixels used in the matching arrangement in the overlapping area;

compare at least one of brightness information of a ridge and a valley, ridge direction information, and ridge curvature information between the adjacent pixels in the inputted fingerprint image and pixels, corresponding to the adjacent pixels, in the registered fingerprint image, respectively, to determine the similarity.

8. The apparatus of claim 6, further comprising:

a calculation check unit configured to check whether the similarity has been determined for all of the comparison target pixels and the comparison reference pixels;

an interval check unit configured to check whether the second interval of the comparison reference pixels is equal to a unit interval when it is checked that the similarity has been determined for all of the comparison target pixels and the comparison reference pixels; and an area selection unit configured to select, when it is checked that the second interval of the comparison reference pixels is greater than the unit interval, at least one candidate area for a fingerprint comparison having a new interval smaller than the second interval.

9. The apparatus of claim 8, wherein the area selection unit is configured to:

compare the correlation score obtained, when it is determined that the first region and the second region are similar to each other, with a threshold;

select, as the candidate area, an area having the correlation score equal to or greater than the threshold in the registered fingerprint image; and select the comparison reference pixels in the candidate area arranged at the new interval smaller than the second interval.

* * * * *